(12) United States Patent
Mao (10) Patent No.: US 10,460,092 B2
(45) Date of Patent: Oct. 29, 2019

(54) FINGERPRINT IDENTIFICATION SYSTEM AND METHOD AND DISPLAY DEVICE

(71) Applicant: BOE TECHNOLOGY GROUP CO., LTD., Beijing (CN)

(72) Inventor: Defeng Mao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 38 days.

(21) Appl. No.: 15/327,033

(22) PCT Filed: Dec. 31, 2015

(86) PCT No.: PCT/CN2015/100108
§ 371 (c)(1),
(2) Date: Jan. 17, 2017

(87) PCT Pub. No.: WO2017/024748
PCT Pub. Date: Feb. 16, 2017

(65) Prior Publication Data
US 2017/0213019 A1 Jul. 27, 2017

(30) Foreign Application Priority Data
Aug. 10, 2015 (CN) .......................... 2015 1 0487510

(51) Int. Cl.
*H04L 29/00* (2006.01)
*G06F 21/32* (2013.01)
(Continued)

(52) U.S. Cl.
CPC .......... *G06F 21/32* (2013.01); *G06F 3/03547* (2013.01); *G06F 3/0488* (2013.01);
(Continued)

(58) Field of Classification Search
CPC .............................. G06F 21/32; G06F 3/0488
(Continued)

(56) References Cited

U.S. PATENT DOCUMENTS

2008/0092245 A1\* 4/2008 Alward ................. G06F 21/316
726/28
2009/0224874 A1 9/2009 Dewar et al.
(Continued)

FOREIGN PATENT DOCUMENTS

CN 102508612 A 6/2012
CN 102736854 A 10/2012
(Continued)

OTHER PUBLICATIONS

Rene Ritche/ How TouchID works: MAking sense of Apple's fingerprint identity sensor/ Sep. 14, 2013/pp. 1-36.\*
(Continued)

*Primary Examiner* — Brandon S Hoffman
*Assistant Examiner* — Michael D Anderson
(74) *Attorney, Agent, or Firm* — Kinney & Lange, P.A.

(57) ABSTRACT

Disclosed are a fingerprint identification system and a fingerprint identification method and a display device capable of simplifying operations of starting an application by a user. The fingerprint identification system includes: a fingerprint identification region arranged on a touch screen to acquire an input fingerprint; a fingerprint verification module connected with the fingerprint identification region to verify whether the input fingerprint is a fingerprint of a user and to unlock the touch screen if it is determined that the input fingerprint is the fingerprint of the user; an application start control module connected with the fingerprint identification region and the fingerprint verification module respectively to obtain a finger press direction from the input fingerprint and start an application corresponding to the finger press direction when the input fingerprint is the fingerprint of the user. The finger press direction is a direction in which the finger sequentially contacts the fingerprint identification region upon pressing the fingerprint identification region or a
(Continued)

direction opposite thereto, and the finger press direction corresponds to at least one application. The fingerprint identification system of the present invention is used to unlock the touch screen and start the application.

18 Claims, 5 Drawing Sheets

(51) Int. Cl.

| | | |
|---|---|---|
| *G06F 3/0488* | (2013.01) | |
| *G06K 9/00* | (2006.01) | |
| *G06K 19/07* | (2006.01) | |
| *G06F 3/0354* | (2013.01) | |
| *G06F 3/0481* | (2013.01) | |

(52) U.S. Cl.
CPC ..... *G06K 9/00087* (2013.01); *G06K 19/0718* (2013.01); *G06F 3/04817* (2013.01)

(58) Field of Classification Search
USPC .......................................................... 726/19
See application file for complete search history.

(56) References Cited

U.S. PATENT DOCUMENTS

| | | | | |
|---|---|---|---|---|
| 2012/0071149 | A1* | 3/2012 | Bandyopadhyay ... | G06F 1/1643 455/418 |
| 2014/0302818 | A1* | 10/2014 | Fyke ...................... | G06F 21/32 455/411 |
| 2015/0047017 | A1 | 2/2015 | Kim et al. | |
| 2015/0062032 | A1 | 3/2015 | Xie | |
| 2017/0147850 | A1* | 5/2017 | Liu ...................... | G06K 9/0002 |

FOREIGN PATENT DOCUMENTS

| | | |
|---|---|---|
| CN | 103092489 A | 5/2013 |
| CN | 103886237 A | 6/2014 |
| CN | 104077518 A | 10/2014 |
| CN | 104360734 A | 2/2015 |
| CN | 104360802 A | 2/2015 |
| CN | 104765994 A | 7/2015 |
| CN | 104778395 A | 7/2015 |
| CN | 105095720 A | 11/2015 |

OTHER PUBLICATIONS

International Search Report and Written Opinion (including English translation of Box V) dated May 11, 2016, for corresponding PCT Application No. PCT/CN2015/100108.
First Chinese Office Action, for Chinese Patent Application No. 201510487510.0, dated Sep. 4, 2017, 15 pages.
Extended European Search Report dated Mar. 14, 2019, received for corresponding European Application No. 15891411.9.

* cited by examiner

FINGERPRINT IDENTIFICATION SYSTEM AND METHOD AND DISPLAY DEVICE

CROSS-REFERENCE TO RELATED APPLICATION

This application claims the benefit of Chinese Patent Application No. CN201510487510.0 filed on Aug. 10, 2015 in the State Intellectual Property Office of China, the whole disclosure of which is incorporated herein by reference.

BACKGROUND OF THE INVENTION

Field of the Invention

Embodiments of the present invention relate to field of display technique, in particular to a fingerprint identification system, a fingerprint identification method and a display device.

Description of the Related Art

Currently, a small display device such as a mobile phone or a Pad (portable Android Device) has been applicable to many aspects of daily working and life of the people.

The small display device generally comprises a touch screen through which a user interacts with the display device. In order to ensure information security, the user often sets an unlocking code for the display device. Only when the correct unlocking code is input, the touch screen of the display device will be unlocked to allow a touch operation of the user.

When the user wish to start a certain application on the above display device, it is necessary for the user to firstly input the unlocking code to unlock the touch screen of the display device so as to enter a main interface of the touch screen and then retrieve and click an icon of the application to be started. The operations in this mode for starting the application is complicated, which may waste the time of the user.

SUMMARY OF THE INVENTION

Embodiments of the present invention are intended to provide a fingerprint identification system and a fingerprint identification method and a display device to simplify operations of starting an application by a user and save the time of the user.

According to a first aspect of the present invention, there is provided a fingerprint identification system connected with a touch screen, comprising: a fingerprint identification region arranged on the touch screen to acquire an input fingerprint; a fingerprint verification module connected with the fingerprint identification region to verify whether the input fingerprint is a fingerprint of a user and to unlock the touch screen if it is determined that the input fingerprint is the fingerprint of the user; an application start control module connected with the fingerprint identification region and the fingerprint verification module respectively to obtain a finger press direction from the input fingerprint and start an application corresponding to the finger press direction when the input fingerprint is the fingerprint of the user, wherein the finger press direction is a direction in which the finger sequentially contacts the fingerprint identification region upon pressing the fingerprint identification region or a direction opposite thereto, and the finger press direction corresponds to at least one application.

According to an exemplary embodiment of the present invention, the application start control module comprises: a direction obtaining unit connected with the fingerprint identification region and the fingerprint verification module respectively to obtain the finger press direction based on the input fingerprint when the input fingerprint is the fingerprint of the user; an angle calculation unit connected with the direction obtaining unit to calculate an angle formed between the finger press direction and a reference direction, the angle being positive in an anticlockwise direction; a storage unit storing correspondences between preset angle ranges and applications, wherein the preset angle ranges are within an angle range of 360 degree in the anticlockwise direction from the reference direction as a starting direction, and each of the preset angle ranges corresponds to at least one application; and a determination unit connected with the angle calculation unit and the storage unit respectively to determine a preset angle rang within which the calculated angle is, retrieve an application corresponding to the calculated angle based on the correspondences between the preset angle ranges and the applications, and start the application.

According to an exemplary embodiment of the present invention, the direction obtaining unit comprises a pressure sensor.

According to an exemplary embodiment of the present invention, the storage unit further stores correspondences between the preset angle ranges and display content orientations; and the determination unit is further configured to retrieve a display content orientation corresponding to the calculated angle based on the correspondences between the preset angle ranges and the display content orientations and allows the started application to be displayed in the display content orientation.

According to an exemplary embodiment of the present invention, the display content orientations comprise a first direction, a second direction, a third direction and a fourth direction. The first direction is parallel with a long side of the touch screen and directed from a top to a bottom of the touch screen. The second direction is parallel with the long side of the touch screen and directed from the bottom to the top of the touch screen. The third direction is parallel with a short side of the touch screen and directed from a left side to a right side of the touch screen. The fourth direction is parallel with the short side of the touch screen and directed from the right side to the left side of the touch screen.

According to an exemplary embodiment of the present invention, the storage unit further stores correspondences between the preset angle ranges and display content aspect ratios. The determination unit further retrieves a display content aspect ratio corresponding to the calculated angle based on the correspondences between the preset angle ranges and the display content aspect ratios and allows the started application to be displayed in the display content aspect ratio.

According to an exemplary embodiment of the present invention, the correspondences between the preset angle ranges and the applications comprise correspondences between the preset angle ranges as well as fingers inputting the fingerprint and the applications. The determination unit determines the preset angle range within which the calculated angle is, and determines a finger inputting the fingerprint, retrieves an application corresponding to the calculated angle and the finger inputting the fingerprint based on the correspondences between the preset angle ranges as well as fingers inputting the fingerprint and the applications, and starts the application.

Alternatively, the correspondences between the preset angle ranges and the applications comprise correspondences between the preset angle ranges as well as finger press zones and applications; and the determination unit determines the preset angle range within which the calculated angle is, and determines a finger press zone, retrieves an application corresponding to the calculated angle and the finger press zone based on the correspondences between the preset angle ranges as well as the finger press zones and the applications, and starts the application.

According to an exemplary embodiment of the present invention, the application start control module further comprises a press prompt unit connected with the touch screen and the fingerprint identification region to control a display of the fingerprint identification region on the touch screen before inputting the fingerprint and divide the displayed fingerprint identification region into a plurality of zones, each of which corresponds to one of the preset angle ranges to prompt the user a finger press direction upon inputting a fingerprint.

According to an exemplary embodiment of the present invention, the plurality of zones in the fingerprint identification region are divided around a point inside the fingerprint identification region and intersect with each other at this point.

Alternatively, the plurality of zones divided in the fingerprint identification region intersect with each other at a point on a boundary of the fingerprint identification region.

According to an exemplary embodiment of the present invention, each zone divided in the fingerprint identification region has an icon of an application corresponding to the zone.

According to an exemplary embodiment of the present invention, the reference direction is parallel with a long side or a short side of the touch screen.

According to an exemplary embodiment of the present invention, the fingerprint identification region is overlapped with any portion of or all of the area of the touch screen.

According to an exemplary embodiment of the present invention, the fingerprint identification region has a circular, elliptic, rectangular, or sector shape.

According to a second aspect of the present invention, there is provided a fingerprint identification method for operating a touch screen comprising: step S1: acquiring an input fingerprint; step S2: verifying whether the input fingerprint is a fingerprint of a user, and unlocking the touch screen if it is determined that the input fingerprint is the fingerprint of the user, and then proceeding to step S3; step S3: obtaining a finger press direction from the input fingerprint and starting an application corresponding to the finger press direction, wherein the finger press direction is a direction in which the finger sequentially contacts a fingerprint identification region upon pressing the fingerprint identification region or a direction opposite thereto, and the finger press direction corresponds to at least one application.

According to an exemplary embodiment of the present invention, the step S3 comprises: step S311: obtaining a finger press direction from the input fingerprint; step S32: calculating an angle formed between the finger press direction and a reference direction; step S33: determining a preset angle range within which the calculated angle is, retrieving an application corresponding to the calculated angle based on correspondences between the preset angle ranges and the applications, and starting the application. The preset angle ranges are within an angle range of 360 degree in the anticlockwise direction from the reference direction as a starting direction, and each of the preset angle ranges corresponds to at least one application.

According to an exemplary embodiment of the present invention, the step S3 further comprises retrieving a display content orientation corresponding to the calculated angle based on correspondences between the preset angle ranges and display content orientations and allowing the started application to be displayed in the display content orientation.

Alternatively, the step S3 further comprises retrieving a display content aspect ratio corresponding to the calculated angle based on correspondences between the preset angle ranges and the display content aspect ratios and allowing the started application to be displayed in the display content aspect ratio.

According to an exemplary embodiment of the present invention, the step S3 comprises determining a preset angle range within which the calculated angle is, and determining a finger inputting the fingerprint, retrieving an application corresponding to the calculated angle and the finger inputting the fingerprint based on correspondences between the preset angle ranges as well as fingers inputting the fingerprint and the applications, and start the application Alternatively, the step S3 comprises determining a preset angle range within which the angle is, and determining a finger press zone, retrieving an application corresponding to the calculated angle and the finger press zone based on correspondences between the preset angle ranges as well as the finger press zones and the applications, and start the application.

According to an exemplary embodiment of the present invention, the fingerprint identification method further comprises controlling a display of the fingerprint identification region on the touch screen before inputting the fingerprint and dividing the displayed fingerprint identification region into a plurality of zones, each of which corresponding to one of the preset angle ranges to prompt the user a finger press direction upon inputting a fingerprint.

According to a third aspect of the present invention, there is provided a display device comprising a touch screen and the fingerprint identification system as described above connected with the touch screen.

In the fingerprint identification system, the fingerprint identification method and the display device of the present disclosure, the fingerprint verification is combined with the finger press direction, and the fingerprint identification region, the fingerprint verification module and the application start control module are provided. The fingerprint identification region acquires the input fingerprint, and the fingerprint verification module verifies whether the input fingerprint is the fingerprint of the user. If it is determined that the input fingerprint is the fingerprint of the user, the touch screen is unlocked. The application start control module obtains the finger press direction from the input fingerprint and starts the application corresponding to the finger press direction so as to complete the identification verification (i.e., unlocking of the touch screen) and the starting of the application only through a single fingerprint input when the user wishes to start a certain or some certain application(s), rather than inputting the complicated code, unlocking the touch screen and then looking for the icon of the application and then starting the application, which greatly simplifies the operations of starting the application by the user and saves the time of the user.

BRIEF DESCRIPTION OF THE DRAWINGS

In order to clearly describe schemes of embodiments of the present and the prior art, accompanying drawings necessary for describing the embodiments of the present and the prior art will be simply described. Obviously, the accompanying drawings described below are merely some embodiments of the present invention, and those ordinary skilled in the art may arrive at other accompanying drawings based on these accompanying drawings without any inventive steps.

REFERENCE LIST

1: fingerprint identification region
2: fingerprint verification module
21: fingerprint image processing unit
22: fingerprint database
23: feature matching unit
3: application start control module
31: direction obtaining unit
32: angle calculation unit
33: storage unit
34: determination unit
A: first-contact point
B: last-contact point
100: touch screen
Y1: first direction
Y2: second direction
Y3: third direction
Y4: fourth direction
X1-X8: finger press direction
①~⑧: divided zones in the fingerprint identification region

DETAILED DESCRIPTION OF PREFERRED EMBODIMENTS OF THE INVENTION

In order to easily and clearly understand the above object, features and advantages of the present invention, the technical scheme of the embodiments of the present invention will be clearly and completely described below with reference the accompanying drawings. Obviously, the described embodiments are merely some embodiments of the present invention, rather than all embodiments of the present invention. All other embodiments obtained by those ordinary skilled in the art without any inventive steps fall within the scope of the present invention.

First Embodiment

Figure 1:
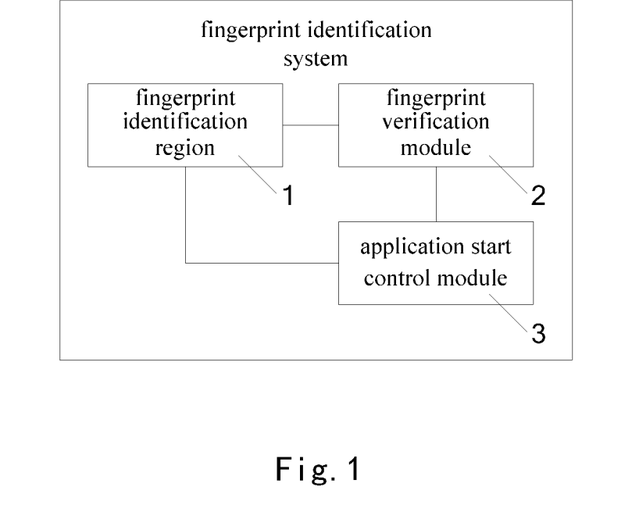
FIG. 1 is a schematic block diagram of a fingerprint identification system according to a first embodiment the present invention.

According to a first embodiment, there is provided a fingerprint identification system connected with a touch screen. As shown in FIG. 1, the fingerprint identification system comprises: a fingerprint identification region 1, a fingerprint verification module 2 and an application start control module 3. The fingerprint identification region 1 is arranged on the touch screen to acquire an input fingerprint. The fingerprint verification module 2 is connected with the fingerprint identification region 1 to verify whether the input fingerprint is a fingerprint of a user and to unlock the touch screen if it is determined that the input fingerprint is the fingerprint of the user. The application start control module 3 is connected with the fingerprint identification region 1 and the fingerprint verification module 2 respectively to obtain a finger press direction from the input fingerprint and start an application corresponding to the finger press direction when the input fingerprint is the fingerprint of the user.

Figure 4:
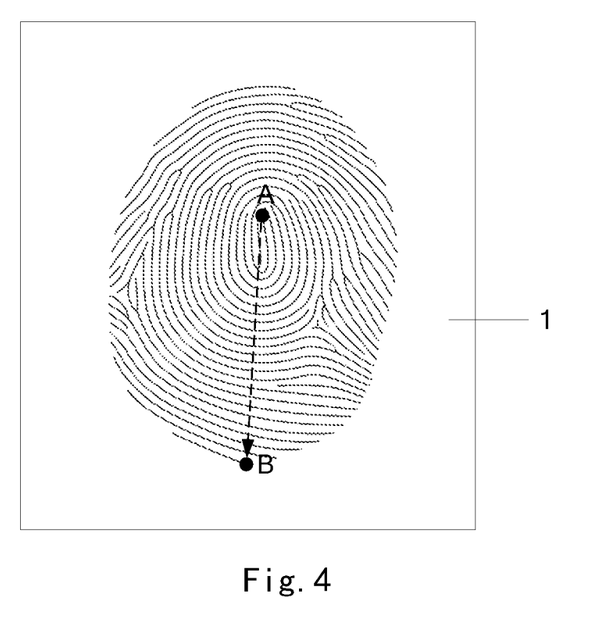
FIG. 4 is a diagram of a finger press direction.

The finger press direction is a direction in which the finger sequentially contacts the fingerprint identification region upon pressing the fingerprint identification region or a direction opposite thereto. As shown in FIG. 4, when the finger presses the fingerprint identification region, respective points on a fingertip of the finger do not simultaneously contact the fingerprint identification region. Instead, the respective points on the fingertip of the finger will contact the fingerprint identification region sequentially. For example, if a first-contact-point is the point A in FIG. 4 and a last-contact-point is the point B in FIG. 4, it can be known that the respective points on the fingertip of the finger sequentially contact the fingerprint identification region from the point A to the point B. Therefore, the finger press direction may be defined as a direction from point A to the point B. Of course, during determining the finger press direction, not only the first-contact-point and the last-contact-point are considered. It is necessary to comprehensively consider an order in which the respective points on the fingertip of the finger contact the fingerprint identification region to obtain the finger press direction. The example as described above is only to explain simply "the finger press direction". It should be further noted that since a force exerted by the finger when pressing the fingerprint identification region is determined by the whole finger, mostly, a plane defined by the finger press direction and a finger extending direction is perpendicular to the fingerprint identification region.

Further, in the fingerprint identification system as described above, each finger press direction corresponds to at least one application. For example, when each finger press direction only corresponds to one application, the application started based on the finger press direction is the one application. Further, when each finger press direction corresponds to a plurality of applications, the plurality of applications will be simultaneously started based on the finger press direction. The user can set what finger press direction starts what application or combination of applications correspondingly in advance as desired to satisfy the requirements of the user on different occasions.

In the fingerprint identification system according to the embodiment of the present invention, after the fingerprint is input, it is firstly verified whether the input fingerprint is the fingerprint of the user. If the input fingerprint is the fingerprint of the user, the touch screen is unlocked, and the finger press direction is obtained from the input fingerprint to start the application corresponding to the finger press direction, so that an operation of unlocking the touch screen and an operation of starting the application can be performed by a single fingerprint input when the user wishes to start a certain or some certain applications. Compared with the mode of starting an application in the prior art, the fingerprint identification system according to the embodiment of the present invention can greatly simplify the operation of starting the application by the user and save the time of the user without needing to input a complicated code to unlock the touch screen and then looking for an icon of the application and then starting the application.

Further, when the touch screen is unlocked by the code, the security of the code is low and the code is easy to be cracked. However, in the fingerprint identification system according to the embodiment of the present invention, the touch screen is unlocked by the fingerprint. Since the fingerprint is a unique feature of the user, the security and reliability are relatively high.

Moreover, in a case where more and more codes are needed to be set and memorized in the working and living of the people, if the touch screen is still unlocked by the code, the code is easier to be forgotten, which may cause the screen touch not to be unlocked, thereby bringing unnecessary troubles for the user. In the embodiment of the present invention, the touch screen is unlocked by the fingerprint. Therefore, it is not necessary to memorize the complicated code, thereby avoiding the trouble that the code is forgotten so that the touch screen can not be unlocked, thus improving convenience and user experience when the touch screen is used.

Figure 2:
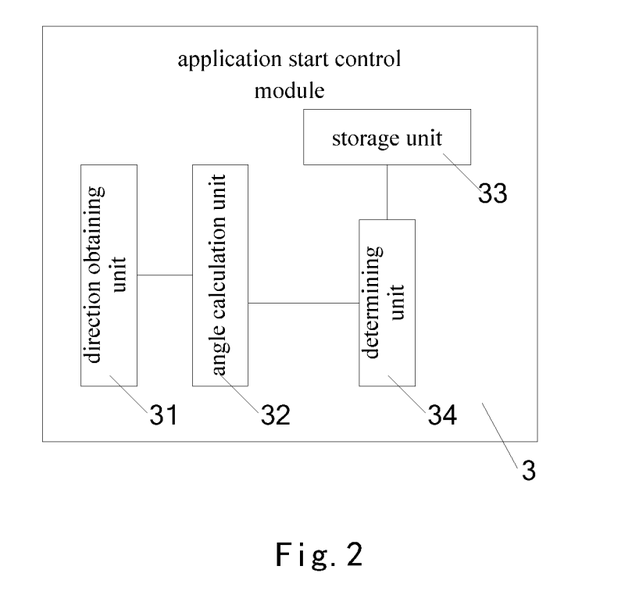
FIG. 2 is a schematic block diagram of an application start control module in the fingerprint identification system according to the first embodiment of the present invention.

In the fingerprint identification system according to the embodiment of the present invention, as shown in FIG. 2, the application start control module 3 may comprise a direction obtaining unit 31, an angle calculation unit 32, a storage unit 33 and a determination unit 34. The direction obtaining unit 31 is connected with the fingerprint identification region 1 and the fingerprint verification module 2 respectively to obtain a finger press direction based on the input fingerprint when the input fingerprint is the fingerprint of the user. The angle calculation unit 32 is connected with the direction obtaining unit 31 to calculate an angle formed between the finger press direction and a reference direction. Note that, the angle is positive in an anticlockwise direction from the reference direction. The storage unit 33 stores correspondences between preset angle ranges and applications. The preset angle ranges are within an angle range of 360 degree in the anticlockwise direction from the reference direction as a starting direction. Each preset angle range corresponds to at least one application. The determination unit 34 is connected with the angle calculation unit 32 and the storage unit 33 respectively to determine a preset angle rang within which the calculated angle is in, retrieve an application corresponding to the calculated angle based on the correspondences between the preset angle ranges and the applications, and start the application.

In the application start control module 3 as described above, a plurality of preset angle ranges are provided, each of which is within an angle range of 360 degree in the anticlockwise direction from the reference direction as the starting direction. The user may set the applications corresponding to these preset angle ranges in advance as desired to generate the correspondences between the preset angle ranges and the applications and then store the correspondences in the storage unit 33. When the user presses the fingerprint identification region in a certain finger press direction to input the fingerprint and successfully unlock the touch screen, in which the finger press direction of the user is chosen by the user based on the preset angle range corresponding to the application to be started, and the angle between the finger press direction and the reference direction should be within the preset angle range corresponding to the application to be started, the direction obtaining unit 32 obtains the finger press direction from the input fingerprint, then the angle calculation unit 32 calculates an angle formed between the finger press direction and a reference direction, and then the determination unit 34 reads the correspondences between the preset angle ranges and the applications stored in the storage unit 33 to retrieve an application corresponding to the preset angle range within which the calculated angle is, and starts the application.

For example, an angle range of 360 degree in the anti-clockwise direction starting from a reference direction nay be divided into four preset angle ranges, including 0-90 degree, 91-180 degree, 181-270 degree and 271-360 degree. The preset angle range of 0-90 degree may be set to correspond to a music application in advance by the user, the preset angle range of 91-180 degree may be set to correspond to a video application in advance by the user, the preset angle range of 181-270 degree may be set to correspond to a chat application in advance by the user, and the preset angle range of 271-360 degree may be set to correspond to a telephone book application in advance by the user. All of these correspondences are stored in the storage unit 33. When wishing to start the video application, the user will press the fingerprint identification region in a X direction, the angle formed between the X direction and the reference direction should be within the preset angle range of 91-180 degree. After a series of procedures such as obtaining the finger press direction by the direction obtaining unit 31, calculating the angle formed between the finger press direction and the reference direction by the angle calculation unit 32 and determining the preset angle range within which the calculated angle is by the determination unit 34, the video application is started.

Note that, the reference direction may be selected as an arbitrary direction on the touch screen. In an exemplary embodiment of the present invention, the reference direction may be parallel with a long or short side of the touch screen.

In addition, in an exemplary embodiment of the present invention, the direction obtaining unit 31 of the application start control module 3 may include a pressure sensor to sense the order in which the respective points on the fingertip contact the fingerprint identification region when the finger presses the fingerprint identification region.

In this embodiment, the fingerprint identification system may be expanded further based on the solution in which the application is started based on the finger press direction.

In order to further simplify the operation of the user, the storage unit 33 of the application start control module 3 may further store correspondences between the preset angle ranges and display content orientations. Accordingly, the determination unit 34 may further retrieve a display content orientation corresponding to the calculated angle based on the correspondences between the preset angle ranges and the display content orientations and allow the started application to be displayed in the display content orientation.

The correspondences between the preset angle ranges and the display content orientations may be set by the user based on his/her preference of using the application as desired in advance. For example, if the user wishes a landscape screen mode while starting the video application, it is possible for the user to set the preset angle range corresponding to the video application to correspond to a display content orientation corresponding to the landscape screen mode, so as to complete three operations including unlocking the touch screen, starting the video application and displaying the application in the landscape screen mode through a single fingerprint input, thereby further simplifying operation of the user.

Figure 5:
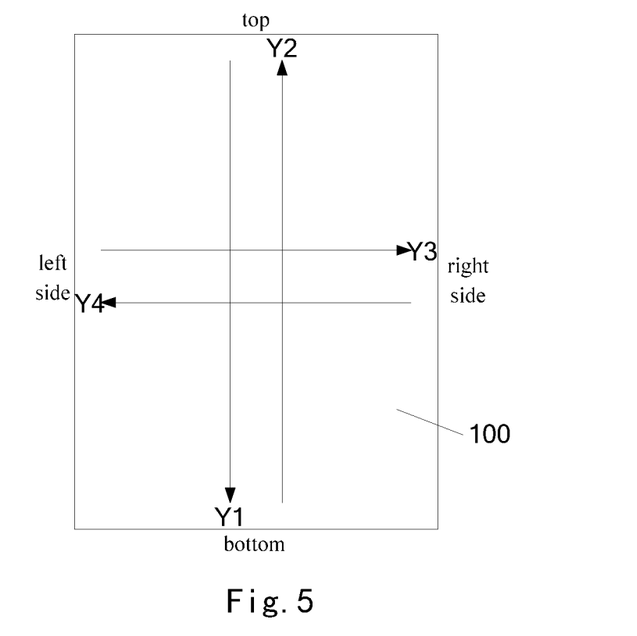
FIG. 5 is a diagram of a display content orientation.

Note that, the display content orientation may be an arbitrary direction on the touch screen. In an exemplary embodiment of the present invention, as shown in FIG. 5, the display content orientation may include a first direction Y1, a second direction Y2, a third direction Y3 and a fourth direction Y4. The first direction Y1 is parallel with a long side of the touch screen 100 and directed from a top to a bottom of the touch screen 100. The second direction Y2 is parallel with the long side of the touch screen 100 and directed from the bottom to the top of the touch screen 100. The third direction Y3 is parallel with a short side of the touch screen 100 and directed from a left side to a right side of the touch screen 100. The fourth direction Y4 is parallel with the short side of the touch screen 100 and directed from the right side to the left side of the touch screen 100.

In order to further simplify the operation of the user, the storage unit 33 of the application start control module 33 may further store correspondences between the preset angle ranges and display content aspect ratios. Accordingly, the determination unit 34 may further retrieve a display content aspect ratio corresponding to the calculated angle based on the correspondences between the preset angle ranges and the display content aspect ratios and allow the started application to be displayed in the display content aspect ratio.

The correspondences between the preset angle ranges and the display content aspect ratios may be set by the user based on his/her preference of using the application as desired in advance. For example, if the user wishes that the touch screen displays in an aspect ratio of 2:1 while starting the video application, it is possible for the user to set the preset angle range corresponding to the video application to correspond to a display content aspect ratio of 2:1, so as to complete three operations including unlocking the touch screen, starting the video application and displaying the video application in the aspect ratio of 2:1 through a single fingerprint input, thereby further simplifying the operation of the user.

Note that, the display content aspect ratio may be an arbitrary aspect ratio such as 2:1, 4:3 or full screen.

In other embodiments of the present invention, it is also possible to combine the display content orientation, the display content aspect ratio and the application together. That is, it is possible to set the correspondences between the preset angle ranges and the applications, the display content orientations as well as the display content aspect ratios in advance so as to complete the operations of unlocking the touch screen, starting the application, and displaying the application in the display content orientation and in the display content aspect ratio by a single fingerprint input, which greatly simplifying the operation of the user.

In order to increase the number of applications able to be started, it is also possible to combine the finger press directions with different fingers. Specifically, the correspondences between the preset angle ranges and the applications may be correspondences between the preset angle ranges as well as fingers inputting the fingerprint and the applications. The determination unit 34 may specifically determine a preset angle range within which the calculated angle is, determine a finger inputting the fingerprint, and retrieve an application corresponding to the calculated angle and the finger inputting the fingerprint based on the correspondences between the preset angle ranges as well as fingers inputting the fingerprint and the applications, and start the application.

The correspondences between the preset angle ranges as well as fingers inputting the fingerprint and the applications may be set by the user based on his/her preference of using the applications as desired in advance. The fingers inputting the fingerprint may include an index finger, a thumb, a middle finger or other fingers. For example, it is possible to set the preset angle range of 0-90 degree and the fingerprint of the index finger to correspond to the video application. Thus, when the angle formed between the finger press direction and the reference direction is within the preset angle range of 0-90 degree and the finger pressing the fingerprint identification region is the index finger, the video application is started. Further, for example, it is possible to set the preset angle range of 0-90 degree and the fingerprint of the thumb to correspond to the music application. Thus, when the angle formed by the finger press direction relative to the reference direction is within the preset angle range of 0-90 degree and the finger pressing the fingerprint identification region is the thumb, the music application is started. Therefore, by increasing the determination condition of the finger inputting the fingerprint, it is possible to start different applications within the same preset angle rang by means of inputting different fingerprints with different fingers, so that the number of the applications to be started is increased.

In order to increase the number of the applications to be started, it is also possible to combine the finger press direction with different press zones. Specifically, the correspondences between the preset angle ranges and the applications may be correspondences between the preset angle ranges as well as the finger press zones and the applications. The determination unit 34 may specifically determine a preset angle range within which the calculated angle is, and determine a finger press zone, and retrieve a application corresponding to the calculated angle and the finger press zone based on the correspondences between the preset angle ranges as well as the finger press zones and the applications, and start the application.

The correspondences between the preset angle ranges as well as the finger press zones and the applications may be set by the user based on his/her preference of using the applications as desired in advance. The finger press zones may include an upper left corner, a lower left corner, an upper right corner, a lower right corner, a center or the like of the fingerprint identification region. For example, it is possible to set the preset angle range of 0-90 degree and the finger press zone which is the upper left corner of the fingerprint identification region to correspond to the video application. Thus, when the angle formed by the finger press direction relative to the reference direction is within the preset angle range of 0-90 degree and the finger presses the fingerprint identification region at the upper left corner thereof, the video application is started. Further, for example, it is possible to set the preset angle range of 0-90 degree and the finger press zone which is the lower right corner of the fingerprint identification region to correspond to the music application. Thus, when the angle formed by the finger press direction relative to the reference direction is within the preset angle range of 0-90 degree and the finger presses the fingerprint identification region at the lower right corner thereof, the music application is started. Therefore, through increasing the determination condition of the finger press zone, it is possible to start different applications within the same preset angle range by means of pressing different zones in the fingerprint identification region with the finger so as to increase the number of the applications to be started.

In order to ensure the user to input the fingerprint in the correct finger press direction, reduce misoperation and improve feasibility and practicability of the above embodiments, in a further exemplary embodiment of the present invention, the application start control module 3 may additionally comprise a press prompt unit. The press prompt unit is connected with the touch screen and the fingerprint identification region 1 to control a display of the fingerprint identification region 1 on the touch screen before inputting the fingerprint and divide the displayed fingerprint identification region 1 into a plurality of zones, each of which corresponds to one of the preset angle ranges to prompt the user a finger press direction upon inputting a fingerprint.

In the above embodiment, through displaying the fingerprint identification region 1 on the touch screen and dividing the preset angle ranges in the displayed fingerprint identification region 1, it is possible for the user to input the fingerprint in the preset angle range corresponding to the application to be started in the correct finger press direction based on the prompt of a displayed content, thereby avoiding troubles that the application desired to be started is not started or an undesired application is started due to misoperation, thus reducing misoperation ratio and improving the feasibility and practicability of the respective embodiments.

Two kinds of fingerprint identification regions 1 having a prompt function will be described below. Note that, only two kinds of fingerprint identification regions 1 are described as examples. In other embodiments of the present invention, the fingerprint identification region may further be divided in other ways. The fingerprint identification region may be equally divided, or may be not equally divided, as long as the divided zones are able to correspond to the respective preset angle ranges.

Figure 6:
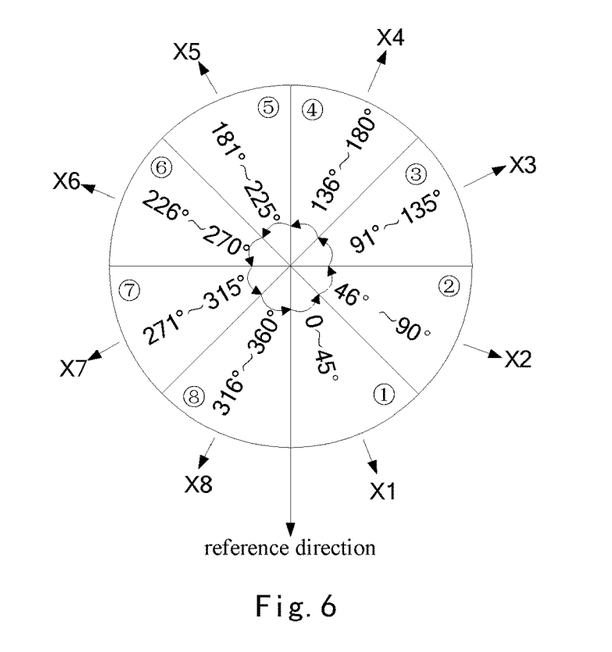
FIG. 6 is a plan view of a fingerprint identification region in the fingerprint identification system according to the first embodiment of the present invention.

The plurality of zones in the fingerprint identification region 1 may be divided around a point inside the fingerprint identification region 1 and intersect with each other at this point. As shown in FIG. 6, assuming that the fingerprint identification region has a circular shape, if the preset angle ranges include 0-45 degree, 46-90 degree, 91-135 degree, 136-180 degree, 181-225 degree, 226-270 degree, 271-315 degree and 316-360 degree, the fingerprint identification region may be divided into eight zones ①-⑧ which correspond to eight preset angle ranges, respectively. The divided eight zones surround a center of the fingerprint identification region and intersect with each other at this center. The user can start the applications corresponding to the preset angle ranges in which eight finger press directions X1-X8 are located in the eight finger press directions under the prompt of the fingerprint identification region, respectively.

Figure 7:
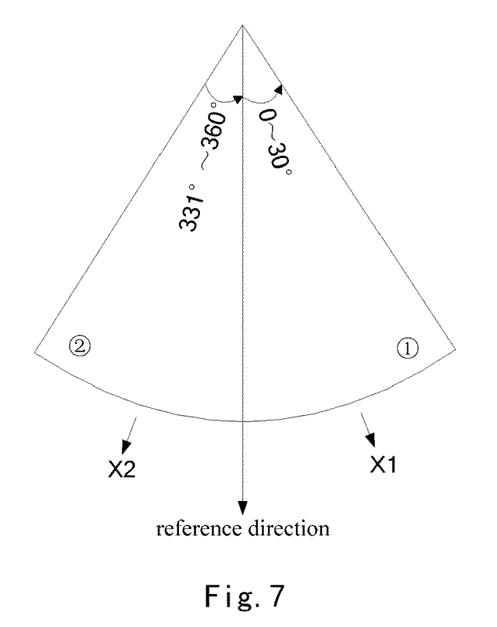
FIG. 7 is a plan view of another fingerprint identification region in a fingerprint identification system according to the first embodiment of the present invention.

The plurality of zones divided in the fingerprint identification region may intersect with each other at a point on a boundary of the fingerprint identification region. As shown in FIG. 7, assuming the fingerprint identification region has a sector shape, if the preset angle ranges include 0-30 degree and 331-360 degree, the fingerprint identification region may be divided into two zones, including a zone ① and a zone ② which correspond to the above two preset angle ranges respectively. The two divided zones intersect with each other at a vertex of the fingerprint identification region. The user can start the applications corresponding to the preset angle ranges in which the two finger press directions X1 and X2 are located in the two finger press directions under the prompt of the fingerprint identification region, respectively.

Note that, during practical operations, the finger press direction necessary for starting a desired application may be not convenient to be operated. In that case, the touch screen may be rotated so that a zone to be pressed is rotated to a position at which the finger can conveniently press. For example, when it is desired to start an application corresponding to the preset angle range of 136-180 degree in the fingerprint identification region as shown in FIG. 6, it is necessary to press the zone ④ in the finger press direction X4. However, the finger can not press the zone ④ in the finger press direction X4 when forwardly facing the touch screen. In that case, it is possible to rotate the touch screen to rotate the zone ④ to the lower right corner so as to facilitate the finger to press this zone.

Based on the embodiment in which the fingerprint identification region 1 is displayed on the touch screen, it is further possible to display an icon of an application corresponding to each zone in the zones divided in the fingerprint identification region 1 such that the user can select the desired application to be started based on the icon of the application displayed in each divided zone without needing to memorize the correspondences between the preset angle ranges and the applications, and then press the corresponding zone with the finger to input the fingerprint, which greatly facilitates the operation of the user.

In the embodiment of the present invention, the fingerprint identification region 1 may be overlapped with any portion of the area or all of the area of the touch screen, i.e., a dimension and a position of the fingerprint identification region 1 are not limited, and can be designed as desired. In an exemplary embodiment of the present invention, the fingerprint identification region 1 may cover all the area of the touch screen so as to input the fingerprint at any position of the touch screen to complete the unlocking of the touch screen and the starting of the application, thereby improving the convenience of the operation of the user.

In addition, the shape of the fingerprint identification region 1 is not limited in the above embodiments, and may be designed as desired. The fingerprint identification region 1 may have a circular, elliptic, rectangular, sector shape or the like.

Figure 3:
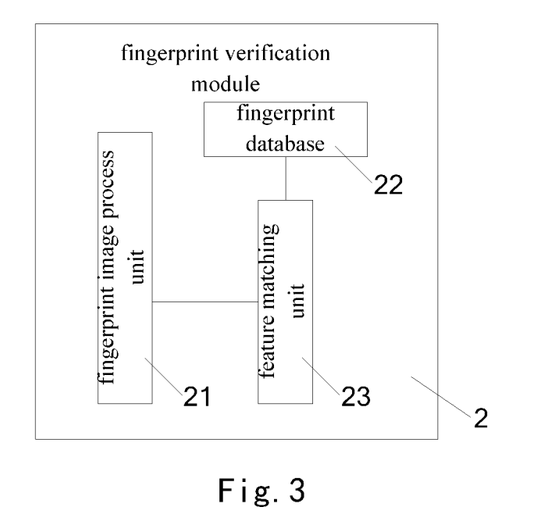
FIG. 3 is a schematic block diagram of a fingerprint verification module in the fingerprint identification system according to the first embodiment of the present invention.

Note that, as shown in FIG. 3, in the fingerprint identification region according to the embodiments of the present invention, the fingerprint verification module 2 may comprise a fingerprint image processing unit 21 connected with the fingerprint identification region 1 to process a fingerprint image acquired in the fingerprint identification region 1, a fingerprint database 22 in which the fingerprint image of the user is stored, and a feature matching unit connected with the fingerprint image processing unit 21 and the fingerprint database 22 to match the processed fingerprint image with the fingerprint image of the user stored in the fingerprint database 22 to determine whether the input fingerprint is the fingerprint of the user.

The fingerprint image acquired in the fingerprint identification region 1 may be processed in the following way: firstly, performing a pre-process so that a fingerprint image data acquired in a certain spatial order generates a corresponding dot matrix, calculating an orientation of each dot, comparing the orientation of each dot with orientations of eight zones adjacent to the dot, if there is a great difference therebetween, the dot is considered as a noise. Otherwise, the orientation of the dot is determined as a main orientation of eight zones adjacent to the dot; then the directional pattern of the dot matrix is divided into blocks of 16×16, calculating a directional histogram of each block, and a peak direction thereof is considered as a direction of the block. Due to noise, low image quality and different fingerprint pressure, the image margin may be damaged, thereby occurring cracking and cross connection, which may result in a false feature point, thereby affecting the identification of the fingerprint. Therefore a directional filter is needed to filter the fingerprint to remove 70%-80% false feature points in the fingerprint image; thereafter, enhancing the quality of the fingerprint image through a feature enhancement technology, performing a binarization process on the fingerprint image. The binarization is to convert the grayscale fingerprint image to a binary image assigned a value of 0 and 1 based on a selected threshold, wherein pixel points higher than the threshold grayscale are converted to 1, and pixel points lower than the threshold grayscale are converted to 0; then, refining lines of the fingerprint image to facilitate feature extracting in the subsequent process. The refining method may include a skeleton line method, a layer-upon-layer advancing method and the like, for example; each line in the refined fingerprint image employs a single pixel to represent a dot line; then a line smoothing process is performed. Thereafter, the image is displayed on a display. Thus a clear dot line image containing the fingerprint feature to be extracted can be shown.

Second Embodiment

Figure 8:
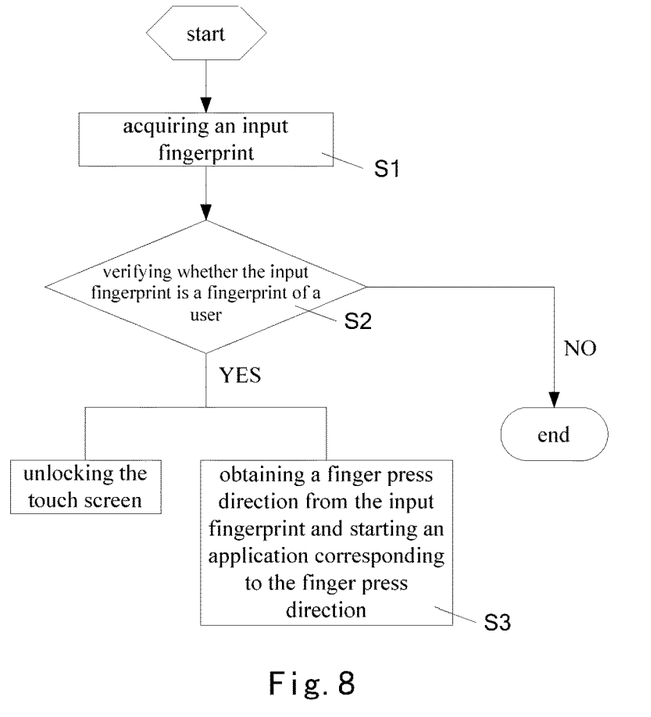
FIG. 8 is a basic flow chart of a fingerprint identification method according to a second embodiment of the present invention.

As shown in FIG. 8, a fingerprint identification method for operating a touch screen according to an exemplary embodiment of the present invention comprising:

Step S1: acquiring an input fingerprint;

Step S2: verifying whether the input fingerprint is a fingerprint of a user, and unlocking the touch screen if it is determined that the input fingerprint is the fingerprint of the user, and then proceeding to step S3:

Step S3: obtaining a finger press direction from the input fingerprint and starting an application corresponding to the finger press direction.

The finger press direction is a direction in which the finger sequentially contacts a fingerprint identification region upon pressing the fingerprint identification region or a direction opposite thereto.

With the fingerprint identification method according to the embodiment of the present invention, when the user wishes to start a certain application or some certain applications, the operations of unlocking the touch screen and starting the application(s) are completed only through a single fingerprint input without needing to input a complicated code to unlock the touch screen and then retrieve an icon of the application and then start the application, which greatly simplify the operation of starting the application by the user and save the time of the user.

Furthermore, compared to a mode in which the touch screen is unlocked by the code, in the embodiment of the present application, the touch screen is unlocked by means of fingerprint, which is more safe and reliable.

In addition, compared to the mode in which the touch screen is unlocked by the code, in the embodiment of the present application, the touch screen is unlocked by means of fingerprint. Therefore, it is not necessary to memorize the complicated code, thereby avoiding a trouble that the code is forgotten and the touch screen cannot be unlocked, thus improving convenience and user experience in using the touch screen.

Note that, if it is determined that the input fingerprint is not the fingerprint of the user in step S2, it is possible to end the whole process so that the touch screen continues keeping in a locked state to ensure the security of the user information.

Figure 9:
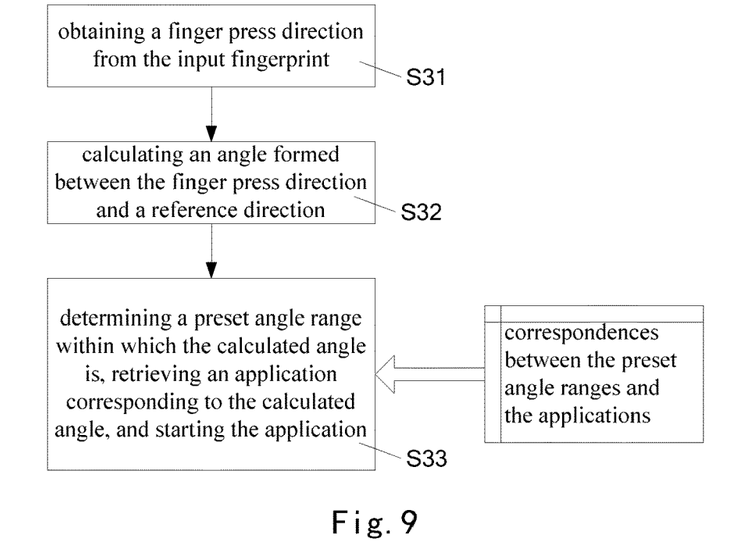
FIG. 9 is a specific flow chart of step S3 in the fingerprint identification method according to the second embodiment of the present invention.

As shown in FIG. 9, in the above fingerprint identification method, the step S3 may specifically comprise:

Step S31: obtaining a finger press direction from the input fingerprint;

Step S32: calculating an angle formed between the finger press direction and a reference direction;

Step S33: determining a preset angle range within which the calculated angle is, retrieving an application corresponding to the calculated angle based on correspondences between preset angle ranges and applications, and starting the application.

The angle is defined as being positive in an anticlockwise direction; the preset angle range is within an angle range of 360 degree in the anticlockwise direction from the reference direction as the starting direction, and each of the present angle ranges corresponds to at least one application.

For details of the step S3, please refer to the specific explanation and description of the application start control module in first embodiment.

Note that, when it is determined that the angle is within a preset angle range, it is necessary to access a storage unit 33 to read the correspondences between the preset angle ranges and the applications from the storage unit 33 so as to retrieve the application corresponding to the angle from the correspondences.

As a first alternative, the step S33 may further comprise retrieving a display content orientation corresponding to the calculated angle based on correspondences between the preset angle ranges and display content orientations, so that the application to be started is displayed in the display content orientation. The correspondences between the preset angle ranges and the display content orientations may be set by the user based on his/her preference of using the application as desired in advance and stored in the storage unit 33. Through the above method, it is possible to complete three operations including unlocking the touch screen, starting the desired application and displaying the application in the set display content orientation through a single fingerprint input, thereby further simplifying the operation of the user.

As a second alternative, the step S33 may further comprise retrieving a display content aspect ratio corresponding to the calculated angle based on correspondences between the preset angle ranges and the display content aspect ratios, so that the application to be started is displayed in the display content aspect ratio. The correspondences between the preset angle ranges and the display content aspect ratios may be set by the user based on his/her preference of using the application as desired in advance and stored in the storage unit 33. Through the above method, it is possible complete three operations including unlocking the touch screen, starting the desired application and displaying the application in the set display content aspect ratio through a single fingerprint input, thereby further simplifying the operation of the user.

As a third alternative, the step S33 may further comprise determining the preset angle range within which the calculated angle is, determining the finger inputting the fingerprint, retrieving the application corresponding to the calculated angle and the finger inputting the fingerprint based on correspondences between the preset angle ranges as well as fingers inputting the fingerprint and the applications, and start the application. The correspondences between the preset angle ranges as well as fingers inputting the fingerprint and the applications may be set by the user based on his/her preference of using the application as desired in advance and stored in the storage unit 33. Therefore, through increasing the determination condition of the finger inputting the fingerprint, it is possible to start different applications within the same preset angle range by means of inputting different fingerprints with different fingers so as to increase the number of the applications to be started.

As a fourth alternative, the step S33 may further comprise determining the preset angle range within which the calculated angle is, determining a finger press zone, retrieving an application corresponding to the calculated angle and the finger press zone based on correspondences between the preset angle ranges as well as the finger press zones and the applications, and start the application. The correspondences between the preset angle ranges as well as the finger press zones and the applications may be set by the user based on his/her preference of using the application as desired in advance and stored in the storage unit 33. Therefore, through increasing the determination condition of the finger press zone, it is possible to start different applications within the same preset angle range by means of pressing different zones in the fingerprint identification region with a finger so as to increase the number of the applications to be started.

In order to ensure the user to input the fingerprint in the correct finger press direction, reduce misoperation and improve feasibility and practicability, in an exemplary embodiment of the present invention, the fingerprint identification method may further comprise controlling a display of the fingerprint identification region on the touch screen before inputting the fingerprint and dividing the displayed fingerprint identification region into a plurality of zones, each of which corresponding to one of the preset angle ranges to prompt the user a finger press direction upon inputting a fingerprint.

Third Embodiment

According to a third embodiment, there is provided a display device comprising a touch screen, and the fingerprint identification system according to the first embodiment as described above connected with the touch screen.

Since the fingerprint identification system of the first embodiment is included, the display device according to the embodiment can complete two operations including unlocking the touch screen and starting the application only through a single fingerprint input, thereby greatly simplifying the operation of starting the application by the user and save the time of the user.

Note that, the display device may include a liquid crystal display device, an electronic paper, an organic light-emitting diode (OLED) display device and the like which is suitable for a mobile phone, a tablet, a laptop, a television, a display, a digital photo frame, a navigator and any other component or product having a display function, especially suitable for small and portable electronics such as the mobile phone, the tablet and the like.

The above discussions are merely described the embodiments of the present invention, and the scope of the present invention is not limited thereto. Various changes or modifications may be made by those skilled in the art without departing from the spirit and scope of the present invention. Therefore, the scope of the present invention is solely defined the appended claims.

What is claimed is:

1. A fingerprint identification system connected with a touch screen, comprising:
    a fingerprint identification region arranged on the touch screen to acquire an input fingerprint;
    a fingerprint verification module connected with the fingerprint identification region and configured to verify whether the input fingerprint is a fingerprint of a user and to unlock the touch screen if it is determined that the input fingerprint is the fingerprint of the user; and
    an application start control module connected with the fingerprint identification region and the fingerprint verification module, respectively, and configured to obtain a finger press direction from the input fingerprint and start an application corresponding to the finger press direction when the input fingerprint is the fingerprint of the user, wherein the finger press direction is a direction formed according to an order in which the respective points on the fingertip of the finger contact the fingerprint identification region when the finger presses the fingerprint identification region or a direction opposite thereto; and the finger press direction corresponds to at least one application,
    wherein the application start control module comprises:
        a direction obtaining unit connected with the fingerprint identification region and the fingerprint verification module, respectively, and configured to obtain the finger press direction based on the input fingerprint when the input fingerprint is the fingerprint of the user;
        an angle calculation unit connected with the direction obtaining unit and configured to calculate an angle formed between the finger press direction and a reference direction, the angle being positive in an anticlockwise direction;
        a storage unit storing correspondences between preset angle ranges and applications, wherein the preset angle ranges are within a range of 360 degrees in the anticlockwise direction from the reference direction as a starting direction, and each of the preset angle ranges corresponds to at least one application; and
        a determination unit connected with the angle calculation unit and the storage unit, respectively, and configured to determine the preset angle range within which the calculated angle falls, retrieve an application corresponding to the calculated angle based on the correspondences between the preset angle ranges and the applications, and start the application.

2. The fingerprint identification system according to claim 1, wherein the direction obtaining unit comprises a pressure sensor.

3. The fingerprint identification system according to claim 1, wherein
    the storage unit further stores correspondences between the preset angle ranges and display content orientations; and
    the determination unit is further configured to retrieve a display content orientation corresponding to the calculated angle based on the correspondences between the preset angle ranges and the display content orientations and allows the started application to be displayed in the display content orientation.

4. The fingerprint identification system according to claim 3, wherein
    the display content orientation comprises a first direction, a second direction, a third direction and a fourth direction;
    the first direction is parallel with a long side of the touch screen and directed from a top to a bottom of the touch screen;
    the second direction is parallel with the long side of the touch screen and directed from the bottom to the top of the touch screen;
    the third direction is parallel with a short side of the touch screen and directed from a left side to a right side of the touch screen; and
    the fourth direction is parallel with the short side of the touch screen and directed from the right side to the left side of the touch screen.

5. The fingerprint identification system according to claim 1, wherein
the storage unit further stores correspondences between the preset angle ranges and display content aspect ratios; and
the determination unit is further configured to retrieve the display content aspect ratio corresponding to the calculated angle based on the correspondences between the preset angle ranges and the display content aspect ratios and allow the started application to be displayed in the display content aspect ratio.

6. The fingerprint identification system according to claim 1, wherein
the correspondences between the preset angle ranges and the applications comprise correspondences between the preset angle ranges as well as fingers inputting the fingerprint and the applications; and
the determination unit is configured to determine the preset angle range within which the calculated angle falls, determine the finger inputting the fingerprint, retrieve the application corresponding to the calculated angle and the finger inputting the fingerprint based on the correspondences between the preset angle ranges as well as fingers for inputting the fingerprint and the applications, and start the application.

7. The fingerprint identification system according to claim 1, wherein
the correspondences between the preset angle ranges and the applications comprise correspondences between the preset angle ranges as well as finger press zones and the applications; and
the determination unit is configured to determine the preset angle range within which the calculated angle falls, determines the finger press zone, and retrieve the application corresponding to the calculated angle and the finger press zone based on the correspondences between the preset angle ranges as well as the finger press zones and the applications, and start the application.

8. The fingerprint identification system according to claim 1, wherein the application start control module further comprises a press prompt unit connected with the touch screen and the fingerprint identification region to control a display of the fingerprint identification region on the touch screen before inputting the fingerprint and divide the displayed fingerprint identification region into a plurality of zones, each of which corresponds to one of the preset angle ranges to prompt the user the finger press direction upon inputting a fingerprint.

9. The fingerprint identification system according to claim 8, wherein
the plurality of zones in the fingerprint identification region are divided around a point inside the fingerprint identification region and intersect with each other at this point; or
the plurality of zones divided in the fingerprint identification region intersect with each other at a point on a boundary of the fingerprint identification region.

10. The fingerprint identification system according to claim 8, wherein the plurality of zones divided in the fingerprint identification region intersect with each other at a point on a boundary of the fingerprint identification region, and each zone divided in the fingerprint identification region has an icon of an application corresponding to the zone.

11. The fingerprint identification system according to claim 1, wherein the reference direction is parallel with a long side or a short side of the touch screen.

12. A fingerprint identification method for operating a touch screen, comprising:
Step S1: acquiring an input fingerprint;
Step S2: verifying whether the input fingerprint is a fingerprint of a user, and unlocking the touch screen if it is determined that the input fingerprint is a fingerprint of a user, and then proceeding to step S3; and
Step S3: obtaining a finger press direction from the input fingerprint and starting an application corresponding to the finger press direction,
wherein the finger press direction formed according to an order in which the respective points on the fingertip of the finger contact the fingerprint identification region upon pressing the fingerprint identification region or a direction opposite thereto,
wherein the step S3 comprises:
Step S31: obtaining the finger press direction from the input fingerprint;
Step S32: calculating an angle formed between the finger press direction and a reference direction, the angle being positive in an anticlockwise direction from the reference direction;
Step S33: determining a preset angle range within which the calculated angle falls, retrieving an application corresponding to the calculated angle based on correspondences between the preset angle ranges and the applications, and starting the application,
wherein the preset angle ranges are within an angle range of 360 degrees in the anticlockwise direction from the reference direction as a starting direction, and the preset angle range corresponds to at least one application.

13. The fingerprint identification method according to claim 12, wherein the step S33 further comprises:
retrieving a display content orientation corresponding to the calculated angle based on the correspondences between the preset angle ranges and display content orientations and allowing the started application to be displayed in the display content orientation.

14. The fingerprint identification method according to claim 12, wherein the step S3 further comprises:
retrieving a display content aspect ratio corresponding to the calculated angle based on correspondences between the preset angle ranges and display content aspect ratios and allowing the started application to be displayed in the display content aspect ratio.

15. The fingerprint identification method according to claim 12, wherein the step S3 comprises:
determining a preset angle range within which the calculated angle falls, determining a finger inputting the fingerprint, retrieving an application corresponding to the calculated angle and the finger inputting the fingerprint based on correspondences between the preset angle ranges as well as fingers inputting the fingerprint and the applications, and start the application.

16. The fingerprint identification method according to claim 12, wherein the step S33 comprises:
determining a preset angle range within which the calculated angle falls, determining a finger press zone, retrieving an application corresponding to the calculated angle and the finger press zone based on correspondences between the preset angle ranges as well as the finger press zones and the applications, and start the application.

17. The fingerprint identification method according to claim 12, further comprising
controlling a display of the fingerprint identification region on the touch screen before inputting a fingerprint and dividing the displayed fingerprint identification region into a plurality of zones, each of which corresponding to one of the preset angle ranges to prompt the user a finger press direction upon inputting a fingerprint.

18. A fingerprint identification system comprising:

a touch screen; fingerprint identification region arranged on the touch screen to acquire an input fingerprint; a fingerprint verification module connected with the fingerprint identification region and configured to verify whether the input fingerprint is a fingerprint of a user and to unlock the touch screen if it is determined that the input fingerprint is the fingerprint of the user; and an application start control module connected with the fingerprint identification region and the fingerprint verification module, respectively, and configured to obtain a finger press direction from the input fingerprint and start an application corresponding to the finger press direction when the input fingerprint is the fingerprint of the user, wherein the finger press direction is a direction formed according to an order in which the respective points on the fingertip of the finger contact the fingerprint identification region when the finger presses the fingerprint identification region or a direction opposite thereto; and the finger press direction corresponds to at least one application, wherein the application start control module comprises: a direction obtaining unit connected with the fingerprint identification region and the fingerprint verification module, respectively, and configured to obtain the finger press direction based on the input fingerprint when the input fingerprint is the fingerprint of the user; an angle calculation unit connected with the direction obtaining unit and configured to calculate an angle formed between the finger press direction and a reference direction, the angle being positive in an anticlockwise direction; a storage unit storing correspondences between preset angle ranges and applications, wherein the preset angle ranges are within a range of 360 degrees in the anticlockwise direction from the reference direction as a starting direction, and each of the preset angle ranges corresponds to at least one application; and a determination unit connected with the angle calculation unit and the storage unit, respectively, and configured to determine the preset angle range within which the calculated angle falls, retrieve an application corresponding to the calculated angle based on the correspondences between the preset angle ranges and the applications, and start the application.

* * * * *